United States Patent
Singaran et al.

(10) Patent No.: US 11,698,123 B1
(45) Date of Patent: Jul. 11, 2023

(54) AXLE ASSEMBLY HAVING AN INTERAXLE DIFFERENTIAL UNIT

(71) Applicant: ArvinMeritor Technology, LLC, Troy, MI (US)

(72) Inventors: Aneesh N. Singaran, Bangalore (IN); Avinash Ullagaddi, Bangalore (IN); Harish C. Patel, Bangalore (IN)

(73) Assignee: ArvinMeritor Technology, LLC, Troy, MI (US)

(*) Notice: Subject to any disclaimer, the term of this patent is extended or adjusted under 35 U.S.C. 154(b) by 0 days.

(21) Appl. No.: 17/872,210

(22) Filed: Jul. 25, 2022

(51) Int. Cl.
| | |
|---|---|
| *F16H 48/08* | (2006.01) |
| *F16H 37/08* | (2006.01) |
| *F16H 57/04* | (2010.01) |
| *F16H 57/037* | (2012.01) |
| *F16H 57/02* | (2012.01) |

(52) U.S. Cl.
CPC ....... *F16H 37/0813* (2013.01); *F16H 57/037* (2013.01); *F16H 57/0431* (2013.01); *F16H 2048/085* (2013.01); *F16H 2057/02052* (2013.01)

(58) Field of Classification Search
CPC .............. F16H 37/0813; F16H 57/037; F16H 57/0431; F16H 2057/02052; F16H 48/08; F16H 2048/082; F16H 2048/085
See application file for complete search history.

(56) References Cited

U.S. PATENT DOCUMENTS

| | | | | |
|---|---|---|---|---|
| 2,309,441 | A * | 1/1943 | Cook | F16H 48/08 475/237 |
| 5,304,103 | A * | 4/1994 | Schlosser | F16H 57/021 475/230 |
| 5,823,908 | A * | 10/1998 | Stefanek | F16H 48/08 74/413 |
| 6,190,281 | B1 * | 2/2001 | Oates | F16H 48/08 475/230 |
| 6,884,196 | B1 * | 4/2005 | Ziech | B60K 17/16 475/230 |
| 8,398,520 | B1 | 3/2013 | Bassi et al. | |
| 9,410,605 | B2 | 8/2016 | Kluck | |
| 9,506,549 | B2 | 11/2016 | Chandrashekar et al. | |
| 9,719,563 | B2 | 8/2017 | Hirao | |
| 9,816,603 | B2 | 11/2017 | Hayes et al. | |
| 10,113,628 | B2 | 10/2018 | Kluck et al. | |
| 10,156,289 | B2 | 12/2018 | De Stefani et al. | |
| 10,208,846 | B2 | 2/2019 | Chinitz | |

(Continued)

FOREIGN PATENT DOCUMENTS

CN 207315845 U * 5/2018

OTHER PUBLICATIONS

Melekian et al.; U.S. Appl. No. 17/196,178, filed Mar. 9, 2021; 26 Pages.

(Continued)

*Primary Examiner* — Sherry L Estremsky
(74) *Attorney, Agent, or Firm* — Brooks Kushman PC

(57) ABSTRACT

An axle assembly having an interaxle differential unit. The interaxle differential unit includes first and second side gears and a gear nest but does not have a case. The gear nest includes a spider having at least one spider shaft, a pinion gear that is rotatably disposed on the spider shaft, and a pinion gear retainer that is fastened to the spider shaft to retain the pinion gear.

20 Claims, 5 Drawing Sheets

(56) References Cited

U.S. PATENT DOCUMENTS

| | | |
|---|---|---|
| 10,364,872 B2 | 7/2019 | Keeney et al. |
| 10,369,885 B2 | 8/2019 | Keeney et al. |
| 10,378,634 B2 | 8/2019 | Kluck et al. |
| 10,539,218 B2 | 1/2020 | Annigeri et al. |
| 10,703,202 B2 | 7/2020 | Funderburg et al. |
| 11,209,077 B2 * | 12/2021 | Andres ................. B60K 17/36 |
| 2021/0291644 A1 | 9/2021 | Hayes et al. |

OTHER PUBLICATIONS

Naik et al.; U.S. Appl. No. 17/673,218, filed Feb. 16, 2022; 30 Pages.

* cited by examiner

AXLE ASSEMBLY HAVING AN INTERAXLE DIFFERENTIAL UNIT

TECHNICAL FIELD

This relates to an axle assembly having an interaxle differential unit.

BACKGROUND

An axle assembly having an interaxle differential unit is disclosed in U.S. Pat. No. 9,816,603.

SUMMARY

In at least one embodiment, an axle assembly is provided. The axle assembly includes an input shaft, an output shaft, and an interaxle differential unit. The input shaft is rotatable about an axis. The output shaft is rotatable about the axis. The interaxle differential unit includes a first side gear, a second side gear, and a gear nest. The first side gear is rotatable about the axis. The first side gear is selectively couplable to the input shaft. The second side gear is rotatable about the axis with the output shaft. The gear nest includes a spider, first and second pinion gears, and first and second pinion gear retainers. The spider is rotatable with the input shaft. The spider has a spider ring. The spider ring encircles the input shaft. The spider has a first spider shaft and a second spider shaft that extend from the spider ring. The second spider shaft is spaced apart from the first spider shaft. First and second pinion gears are rotatably disposed on the first and second spider shafts, respectively. The first and second pinion gears mesh with the first side gear and the second side gear. The first and second pinion gear retainers are fastened to the first and second spider shafts, respectively, such that the first and second pinion gear retainers are stationary with respect to the first and second spider shafts. The first and second pinion gear retainers engage the first and second pinion gears, respectively. The first and second pinion gear retainers are spaced apart from each other. The spider ring is the only component of the axle assembly that engages the first spider shaft and the second spider shaft.

The interaxle differential unit does not have a case that is rotatable about the axis. As such, the first side gear, the second side gear, and the gear nest are not disposed inside of a case.

The axle assembly may include a differential assembly and a housing assembly. The housing assembly may have an axle housing and a differential carrier. The differential carrier may be mounted to the axle housing. The differential assembly may be rotatably supported upon the differential carrier. The interaxle differential unit is disposed inside the differential carrier. The differential carrier may be the only component of the axle assembly that encircles the axis and the gear nest. The differential carrier may be the only component of the axle assembly that encircles the first side gear.

In at least one embodiment an axle assembly is provided. The axle assembly may include an input shaft, an output shaft, and an interaxle differential unit. The input shaft is rotatable about an axis. The output shaft is rotatable about the axis. The interaxle differential unit includes a first side gear, a second side gear, and a gear nest. The first side gear is rotatable about the axis. The first side gear is selectively couplable to the input shaft. The second side gear is rotatable about the axis with the output shaft. The gear nest includes a spider, a set of pinion gears, and a set of pinion gear retainers. The spider is rotatable with the input shaft. The spider has a spider ring that encircles and engages the input shaft. The spider has a set of spider shafts that extend from the spider ring in a direction that extends away from the axis. Members of the set of spider shafts are spaced apart from each other. Each member of the set of pinion gears meshes with the first side gear and the second side gear. Each member of the set of pinion gears is rotatably disposed on a corresponding member of the set of spider shafts. Each member of the set of pinion gear retainers is fastened to a corresponding member of the set of spider shafts. Each member of the set of pinion gear retainers contacts a corresponding member of the set of pinion gears. Members of the set of pinion gear retainers are spaced apart from each other and do not contact each other.

Each member of the set of pinion gear retainers may have a body and a bearing portion. The body and the bearing portion may cooperate to define an aperture. The aperture may receive a corresponding member of the set of spider shafts. The bearing portion may engage a corresponding member of the set of pinion gears. The bearing portion may extend further from the spider shaft than the body extends from the spider shaft.

The body may define a retainer aperture that receives a retainer pin. The retainer pin may fasten a pinion gear retainer to a corresponding spider shaft.

The body may have a body end surface. The body end surface may face away from the bearing portion. The body may have an outer body surface. The outer body surface may extend from the body end surface to the bearing portion. The body may have an inner body surface. The inner body surface may be disposed opposite the outer body surface. The inner body surface may partially define the aperture. The retainer aperture may extend from the outer body surface to the inner body surface.

The bearing portion may have a bearing surface. The bearing surface may contact a corresponding pinion gear. The bearing surface may be nonplanar.

Each member of the set of spider shafts may extend along a corresponding spider shaft axis. The bearing portion may have an outer bearing portion surface. The outer bearing portion surface may extend from the bearing surface. The bearing portion may have an inner bearing portion surface. The inner bearing portion surface may be disposed opposite the outer bearing portion surface. The inner bearing portion surface may partially define the aperture. The outer bearing portion surface may be disposed further from the spider shaft axis than the outer body surface of the body is disposed from the spider shaft axis.

The bearing portion may have a step surface. The step surface may extend from the outer bearing portion surface to the outer body surface. The step surface may be disposed opposite the bearing surface. The step surface may be disposed in a non-parallel relationship with the bearing surface. The step surface may be disposed in a non-perpendicular relationship with the bearing surface.

Members of the set of spider shafts may have a distal end surface. The distal end surface may face away from the axis. The step surface may be disposed in a non-parallel relationship with a corresponding distal end surface. The step surface may be disposed in a non-perpendicular relationship with a corresponding distal end surface.

Each member of the set of spider shafts may have a cylindrical portion. The cylindrical portion may extend from the distal end surface. The body may encircle the cylindrical portion.

A member of the set of spider shafts may have a flat. The flat may extend from the cylindrical portion. The bearing portion may encircle the flat.

The spider ring may define a center bore. The center bore may receive the input shaft. The spider ring may define a splined portion. The splined portion may be disposed inside the center bore. A groove may be provided in the spider ring. The groove may encircle the axis. The groove may extend away from the axis. The groove may bisect the splined portion.

The spider ring may have an exterior surface. The exterior surface may face away from the axis. The spider ring may have a lubricant passage. The lubricant passage may be disposed inside the spider ring. The lubricant passage may extend from the exterior surface to the center bore. The lubricant passage may extend from the exterior surface to the groove. The lubricant passage may be disposed at an oblique angle with respect to the axis.

DETAILED DESCRIPTION

As required, detailed embodiments of the present invention are disclosed herein. It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
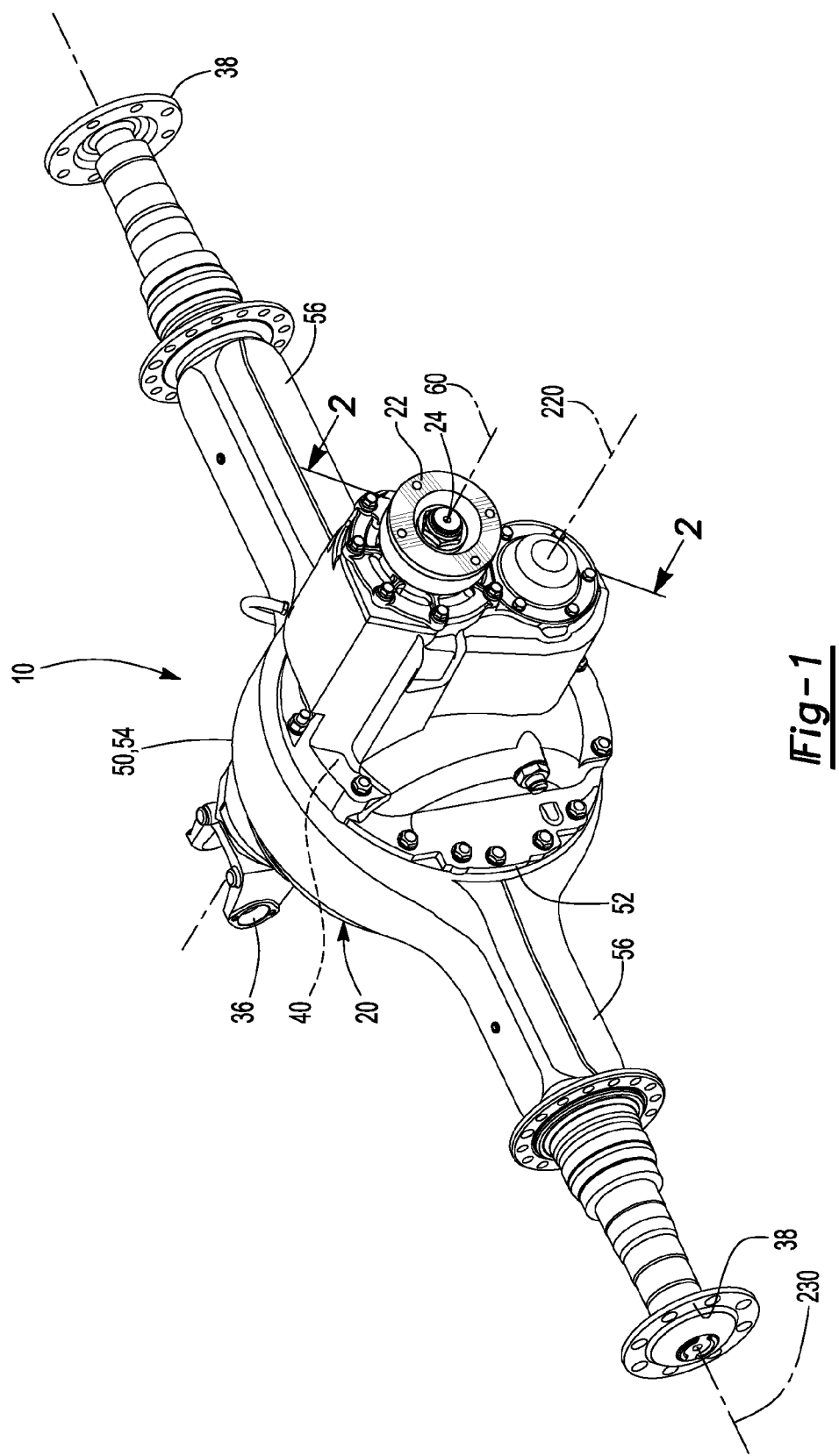
FIG. 1 is a perspective view of an example of an axle assembly.

Referring to FIG. 1, an example of an axle assembly 10 is shown. The axle assembly 10 may be provided with a vehicle of any suitable type, such as a truck, bus, farm equipment, military transport or weaponry vehicle, or cargo loading equipment for land, air, or marine vessels.

The axle assembly 10 may be part of a vehicle drivetrain that may include multiple axle assemblies that may be connected in series. For instance, the axle assembly 10 may be part of a tandem axle drivetrain configuration that may include two axle assemblies connected in series. The axle assembly 10 that is operatively connected to at least one torque source, such as an electric motor or an internal combustion engine, or that is disposed closest to a torque source may be referred to as a first axle assembly. The axle assembly that receives propulsion torque from the torque source through or by way of the first axle assembly may be referred to as a second axle assembly. In FIG. 1, the axle assembly 10 is depicted as being a first axle assembly.

Figure 2:
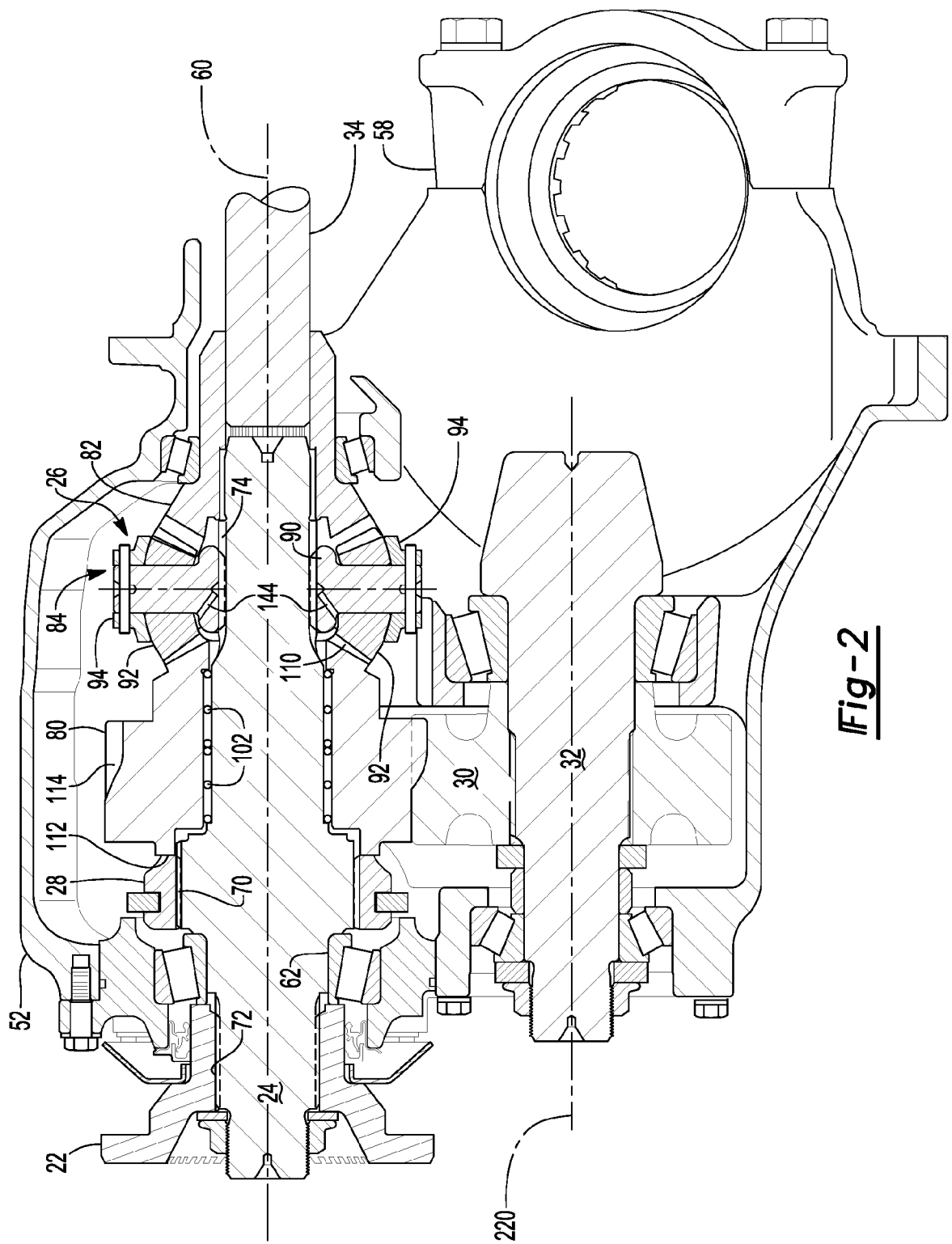
FIG. 2 is a section view of the axle assembly along section line 2-2.

The axle assembly 10 is configured to provide torque to its associated wheel assemblies and may provide torque to the second axle assembly. The axle assembly 10 may include a housing assembly 20 and an input yoke 22 as shown in FIG. 1. As shown in FIG. 2, the axle assembly 10 includes an input shaft 24, an interaxle differential unit 26, and may include a clutch collar 28, a driven gear 30, a drive pinion 32, and an output shaft 34. As is best shown with reference to FIG. 1, the axle assembly 10 may include an output yoke 36, at least one axle shaft 38, and a differential assembly 40.

Referring to FIG. 1, the housing assembly 20 receives various components of the axle assembly 10. In addition, the housing assembly 20 may facilitate mounting of the axle assembly 10 to the vehicle. In at least one configuration, the housing assembly 20 may include an axle housing 50 and a differential carrier 52.

The axle housing 50 may receive and may support the axle shafts 38. In at least one configuration, the axle housing 50 may include a center portion 54 and at least one arm portion 56.

The center portion 54 may be disposed proximate the center of the axle housing 50. The center portion 54 may define a cavity that may at least partially receive the differential assembly 40. A lower region of the center portion 54 may at least partially defines a sump portion that may contain or collect lubricant. Lubricant in the sump portion may be splashed or sprayed by a ring gear of the differential assembly 40 and distributed to lubricate various components.

One or more arm portions 56 may extend from the center portion 54. For example, two arm portions 56 may extend in opposite directions from the center portion 54 and away from the differential assembly 40. The arm portions 56 may have substantially similar configurations. For example, the arm portions 56 may each have a hollow configuration or tubular configuration that may extend around and may receive a corresponding axle shaft 38 and may help separate or isolate the axle shaft 38 or a portion thereof from the surrounding environment. Each arm portion 56 may support a wheel hub and a brake assembly that is configured to brake the wheel hub and hence brake a wheel that is mounted to the wheel hub. An arm portion 56 or a portion thereof may or may not be integrally formed with the center portion 54. It is also contemplated that the arm portions 56 may be omitted.

Referring to FIGS. 1 and 2, the differential carrier 52 is removably mountable to the center portion 54 of the axle housing 50. The differential carrier 52 supports the differential assembly 40. For example, the differential carrier 52 may include one or more bearing supports 58 (which are best shown in FIG. 2 without the differential assembly 40) that may support a roller bearing assembly that may rotatably support the differential assembly 40. The differential carrier 52 may cooperate with the axle housing 50 to define the sump portion.

The input yoke 22, if provided, may facilitate coupling of the axle assembly 10 to a torque source. The input yoke 22 may have any suitable configuration. For instance, the input yoke 22 may have a disc configuration as shown or may have a similar configuration as the output yoke 36. It is contemplated that the input yoke 22 may be omitted, such as when a torque source like an electric motor is integrated with the axle assembly 10. If provided, the input yoke 22 may be operatively connected to the input shaft 24.

Figure 3:
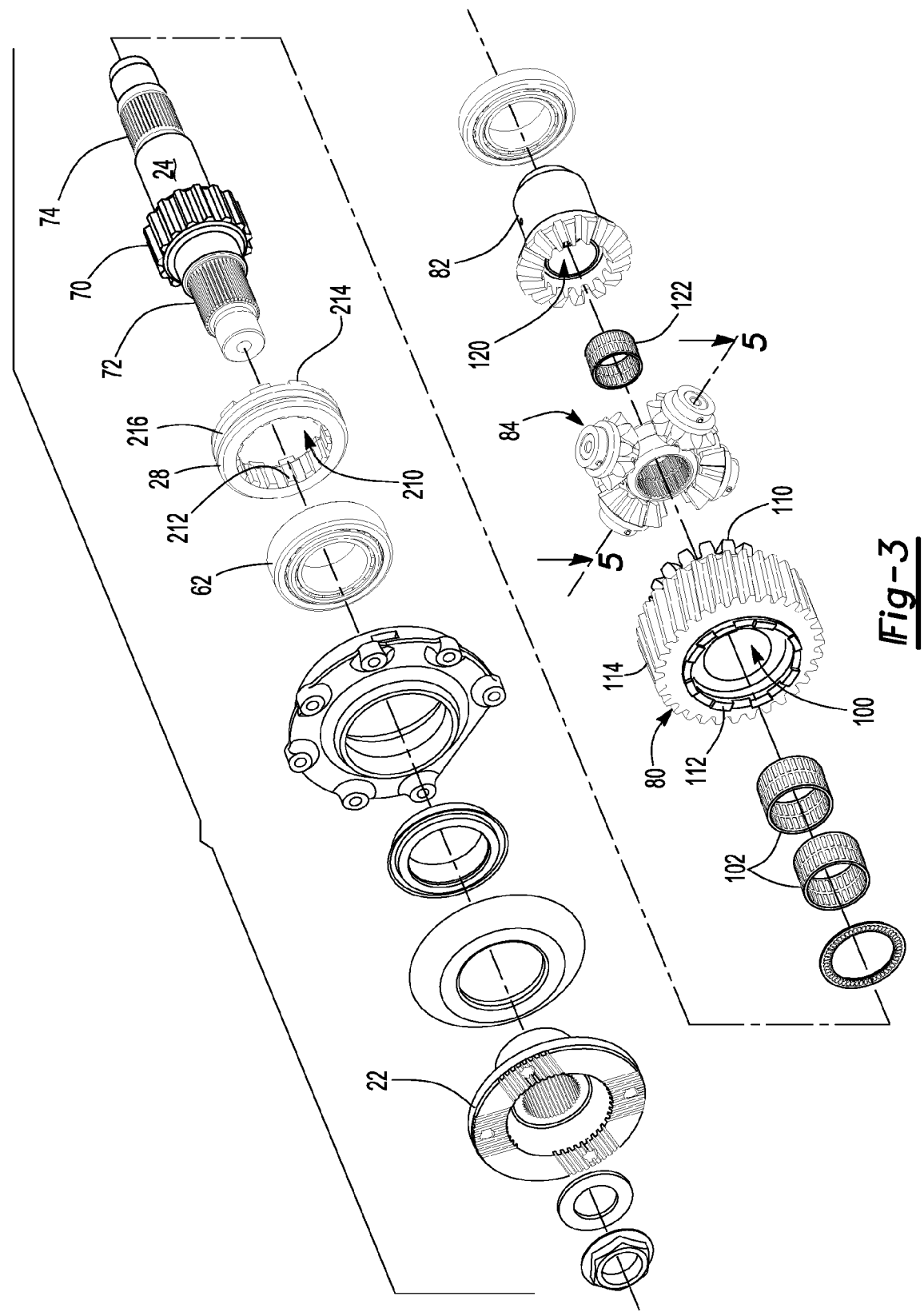
FIG. 3 is a partially exploded view of some components shown in FIG. 2 and includes an interaxle differential unit that has a gear nest. The gear nest is not exploded in FIG. 2.

Referring primarily to FIGS. 2 and 3, an example of an input shaft 24 is shown. The input shaft 24 extends along and is rotatable about an axis 60. For example, the input shaft 24 may be rotatably supported by one or more bearings 62 that may be disposed on the housing assembly 20. The input shaft 24 may be operatively connected to the driven gear 30 and the output shaft 34 via the interaxle differential unit 26. In at least one configuration and as is best shown in FIG. 3, the input shaft 24 may include at least one spline, such as a first spline 70, a second spline 72, a third spline 74, or combinations thereof. A spline may have teeth that may be arranged around the axis 60, may extend away from the axis 60, may be disposed substantially parallel to the axis 60, or combinations thereof. The term "substantially parallel" as used herein means the same as or very close to parallel and includes features or axes that are within ±2° of being parallel each other.

The first spline 70 may engage the clutch collar 28 such that the clutch collar 28 may be rotatable about the axis 60 with the input shaft 24. Moreover, the first spline 70 may permit the clutch collar 28 to move in an axial direction or a direction that extends along the axis 60 with respect to the input shaft 24.

The second spline 72, if provided, may engage the input yoke 22. For instance, the second spline 72 may mate or mesh with a corresponding spline of the input yoke 22 such that the input yoke 22 may be rotatable about the axis 60 with the input shaft 24.

The third spline 74, if provided, may engage a spider 90 of the interaxle differential unit 26 as will be discussed in more detail below.

Figure 4:
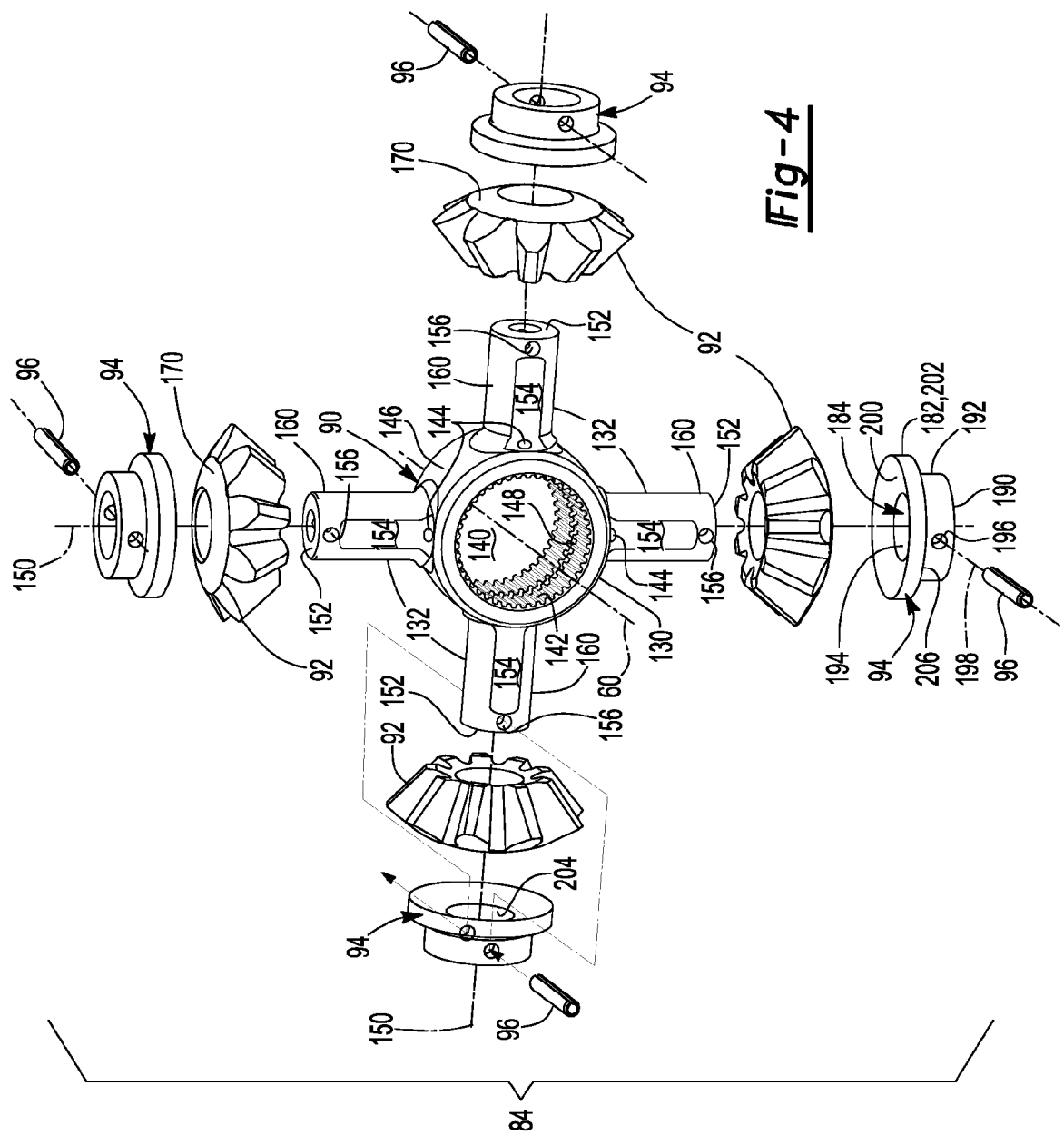
FIG. 4 is an exploded view of the gear nest of the interaxle differential unit.

Referring primarily to FIGS. 2 and 3, an example of an interaxle differential unit 26 is shown. The interaxle differential unit 26 accommodates or compensates for rotational speed differences between different drive axle assemblies, such as speed differences between the axle assembly 10 and a second axle assembly that is connected in series with the axle assembly 10. As an example, the interaxle differential unit 26 may operatively connect the input shaft 24 and the output shaft 34 and may allow the input shaft 24 and output shaft 34 to rotate at different speeds with respect to each other under various operating conditions. The interaxle differential unit 26 may be provided in various locations. In FIG. 2, the interaxle differential unit 26 is disposed inside the housing assembly 20 on the input shaft 24; however, it is contemplated that the interaxle differential unit 26 may be provided in other locations, such as closer to the output yoke 36 or with the second axle assembly. It is also contemplated that interaxle differential unit 26 may be disposed on another shaft. In at least one configuration and as is best shown in FIG. 3, the interaxle differential unit 26 may include a first side gear 80, a second side gear 82, and a gear nest 84. The gear nest 84, which is best shown in FIG. 4, includes a spider 90, at least one pinion gear 92, one or more pinion gear retainers 94, and one or more retainer pins 96.

The interaxle differential unit 26 does not include a case, such as a case that engages and encircles the input shaft 24, the axis 60, the spider 90 or combinations thereof and/or that extends from one spider shaft to another or contacts multiple spider shafts. For instance, the interaxle differential unit 26 does not have a one-piece case, such as is disclosed in U.S. patent application Ser. No. 17/196,178 and U.S. Pat. Nos. 8,398,520 and 9,719,563, or a multi-piece case, such as is disclosed in U.S. patent application Ser. No. 16/827,102 and U.S. Pat. Nos. 9,816,602, 10,208,846, 10,364,872, 10,369,885, and 10,378,634. As such, the interaxle differential unit 26 may be disposed inside the differential carrier 52 in the differential carrier 52 may be the only component or assembly of components that encircles the axis 60 and the first side gear 80, second side gear 82, the gear nest 84, or combinations thereof. The interaxle differential unit 26 may be rotatable about the axis 60 and may be received inside the differential carrier 52 such there is a gap or open space that extends from the gear nest 84 to an interior surface of the differential carrier 52 that is disposed above the interaxle differential unit 26 as shown in FIG. 2.

Referring to FIGS. 2 and 3, the first side gear 80 is rotatable about the axis 60. For instance, the first side gear 80 may have a center bore 100 that may receive or encircle the input shaft 24. Optionally one or more bearings or bearing assemblies 102 may be received in the center bore 100 and may rotatably support the first side gear 80 on the input shaft 24. The first side gear 80 may be rotatable with respect to the spider 90 depending on the position of the clutch collar 28. In addition, the first side gear 80 may be selectively coupled to the input shaft 24 by the clutch collar 28 such that the first side gear 80 is rotatable about the axis 60 with the input shaft 24. In at least one configuration, the first side gear 80 may include side gear teeth 110, face gear teeth 112, and a drive gear 114.

The side gear teeth 110 may be arranged around the axis 60 and may mate or mesh with the teeth of at least one pinion gear 92. The side gear teeth 110 extend toward the gear nest 84 or to the right from the perspective shown in FIG. 2.

The face gear teeth 112 may be disposed proximate a first end of the first side gear 80 that faces away from the gear nest 84. For instance, the face gear teeth 112 may be disposed opposite and may extend away from the side gear teeth 110. As such, the face gear teeth 112 extend toward the clutch collar 28. The face gear teeth 112 may be selectively engaged by the clutch collar 28 as will be discussed in more detail below.

The drive gear 114 has teeth that are arranged around the axis 60 and that extend away from and face away from the axis 60. As is best shown in FIG. 2, teeth of the drive gear 114 may mate or mesh with teeth of driven gear 30. The drive gear 114 may be part of the first side gear 80 and may be integrally formed with the first side gear 80 as a unitary one-piece component. In at least one configuration, the drive gear 114 may be axially positioned closer to the face gear teeth 112 than to the side gear teeth 110.

Referring to FIGS. 2 and 3, the second side gear 82 is rotatable about the axis 60 with the output shaft 34. The second side gear 82 may be coupled to the output shaft 34 in any suitable manner, such as with a fastener, splines, or the like. For example, the second side gear 82 may extend along the axis 60 and may have a center bore 120 that may receive or encircle an end of the output shaft 34 and optionally an end of the input shaft 24. Optionally one or more bearings or bearing assemblies 122 may be received in the center bore 120 and may rotatably support the second side gear 82 on the input shaft 24. The center bore 120 may also include a spline or splined portion that may be spaced apart from the input shaft 24 and that may mate with a corresponding spline of another shaft, such as the output shaft 34. As such, the second side gear 82 may be inhibited from rotating about the axis 60 with respect to the output shaft 34. The second side gear 82 may be rotatable with respect to the spider 90.

Referring primarily to FIG. 4, an exploded view of the gear nest 84 is shown.

The spider 90 is rotatable about the axis 60 with the input shaft 24. The spider 90 may be secured to the input shaft 24 in any suitable manner, such as with one or more fasteners, a weld, mating splines, or the like. In at least one configuration, the spider 90 may include a spider ring 130 and one or more spider shafts 132. In at least one configuration, one pinion gear 92 and one pinion gear retainer 94 may be the only components that encircle each spider shaft 132. One pinion gear 92, one pinion gear retainer 94, and one retainer pin 96 may be the only components that engage or contact each spider shaft 132.

The spider ring 130 encircles the input shaft 24 and the axis 60. The spider ring 130 may also engage the input shaft 24. The spider ring 130 defines a center bore 140 and may have a splined portion 142 and one or more lubricant passages 144.

The center bore 140 encircles and is spaced apart from the axis 60. The center bore 140 may be a through hole through which the input shaft 24 may extend.

Figure 5:
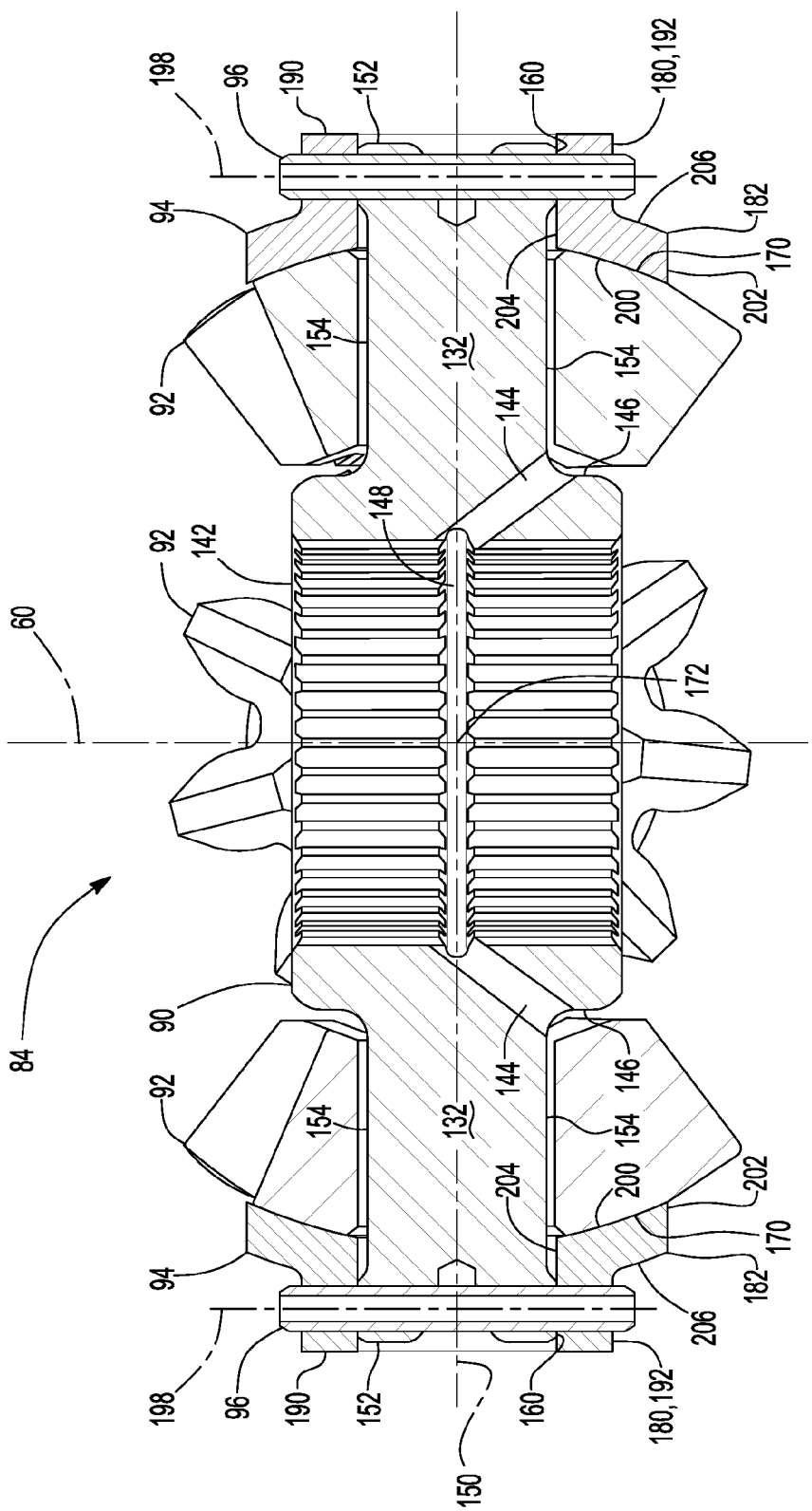
FIG. 5 is a section view of the gear nest along section line 5-5.

Referring to FIGS. 4 and 5, the splined portion 142 is disposed in the center bore 140. The splined portion 142 may mate with a corresponding spline of the input shaft 24, such as the third spline 74, to inhibit the spider 90 from rotating about the axis 60 with respect to the input shaft 24. As is best shown in FIG. 5, the splined portion 142 may include a plurality of spline teeth that may be disposed substantially parallel to the axis 60. Optionally, the splined portion 142 may be bisected by a groove 148 that may encircle the axis 60 and that may extend away from the axis 60.

Referring primarily to FIG. 5, one or more lubricant passages 144 may be provided in the spider ring 130. A lubricant passage 144 may be configured as a through hole that may extend from the groove 148 to an exterior surface 146 of the spider ring 130. For instance, a lubricant passage 144 extend to where the exterior surface 146 meets a spider shaft 132. The exterior surface 146 may be disposed adjacent to a pinion gear 92. As is best shown in conjunction with FIG. 2, the lubricant passages 144 may extend at an oblique angle away from the axis 60 and may extend further away from the axis 60 as the distance from the groove 148 increases. A lubricant passage 144 may extend from the groove 148 toward the first side gear 80. The lubricant passage 144 and groove 148 may help facilitate the flow of lubricant through the gear nest 84.

Referring primarily to FIGS. 4 and 5, one or more spider shafts 132 extend from the spider ring 130. In the configuration shown, four spider shafts 132 are illustrated; however, a greater or lesser number of spider shafts 132 may be provided. Each spider shaft 132 extends in a direction that extends away from the axis 60 and the center bore 140 of the spider 90. In addition, each spider shaft 132 may extend along a corresponding spider shaft axis 150. The spider shafts 132 are arranged such that each spider shaft 132 is coaxially disposed with another spider shaft 132 such that the spider shafts 132 extend along a common spider shaft axis 150. A spider shaft 132 may have a cylindrical or generally cylindrical configuration. The spider shaft 132 may have a distal end surface 152, a flat 154, a retainer hole 156, or combinations thereof.

The distal end surface 152 is disposed at an end of the spider shaft 132. The distal end surface 152 may face away from the axis 60. The spider shaft 132 may extend from the spider ring 130 to the distal end surface 152.

One or more flats 154 may be provided on the exterior of the spider shaft 132. For instance, the spider shaft 132 may have a generally cylindrical configuration that may be interrupted by one or more flats 154 that extend along a portion of the axial length of the spider shaft 132. A flat 154 may extend between the spider ring 130 and the distal end surface 152. A flat 154 may be spaced apart from the spider ring 130, the distal end surface 152, or both. A flat 154 may be a substantially planar surface that may be disposed parallel to the spider shaft axis 150. As is best shown in FIG. 5, a flat 154 may be encircled by the pinion gear 92 and may be disposed closer to a corresponding spider shaft axis 150 than an adjacent cylindrical portion 160 of the spider shaft 132. As such, the flat 154 may provide a gap between the spider shaft 132 and the pinion gear 92 that facilitates the flow of lubricant. It is also contemplated that the flats 154 may be omitted and that a bearing assembly may encircle the spider shaft 132 and rotatably support the pinion gear 92.

Referring primarily to FIG. 4, the retainer hole 156 is configured to receive a retainer pin 96 as will be discussed in more detail below. The retainer hole 156 may be disposed substantially perpendicular to the spider shaft axis 150 and may be configured as a through hole. The retainer hole 156 may be positioned along the spider shaft axis 150 between the distal end surface 152 and the pinion gear 92. In the configuration shown, the retainer hole 156 may be positioned along the spider shaft axis 150 in a cylindrical portion 160 of the spider shaft 132 that is located between the distal end surface 152 and the flats 154.

Referring primarily to FIG. 4, a set of one or more pinion gears 92 may be provided with the gear nest 84. Each pinion gear 92 may be rotatable with respect to a corresponding spider shaft 132. For instance, the pinion gear 92 may define a hole that may receive a corresponding spider shaft 132 in a manner that permits the pinion gear 92 to rotate about the spider shaft 132 and a corresponding spider shaft axis 150. The pinion gear 92 may mesh with the first side gear 80 and the second side gear 82. For instance, the pinion gear 92 may include teeth that may mesh or mate with the side gear teeth 110 of the first side gear 80 and may mesh or mate with teeth of the second side gear 82. The pinion gear 92 may have an arcuate surface 170 that may encircle the hole and that may face toward the pinion gear retainer 94. In at least one configuration, the arcuate surface 170 may be radially disposed with respect to an intersection point 172, which is best shown in FIG. 5, at which the axis 60 and the spider shaft axis 150 may intersect. As such, the arcuate surface 170 may be a part—spherical surface.

Referring to FIGS. 4 and 5, the pinion gear retainer 94 helps retain the pinion gear 92 on the spider shaft 132. A pinion gear retainer 94 may be fastened or attached to a corresponding spider shaft 132 such that the pinion gear retainer 94 is stationary with respect to the spider shaft 132. The pinion gear retainer 94 includes a body 180, a bearing portion 182, and an aperture 184.

The body 180 encircles the spider shaft 132. For instance, the body 180 may encircle the cylindrical portion 160 of the spider shaft 132. The body 180 may be separated from the pinion gear 92 by the bearing portion 182. In at least one configuration, the body 180 may include a body end surface 190, an outer body surface 192, and an inner body surface 194, and a retainer aperture 196

The body end surface 190 may be disposed at an end of the pinion gear retainer 94. The body end surface 190 may face away from the pinion gear 92. The body end surface 190 may encircle the aperture 184 and the aperture 184 may extend from the body end surface 190.

The outer body surface 192 may face away from aperture 184. In at least one configuration, the outer body surface 192 may be an outside circumferential surface of the body 180. The outer body surface 192 may extend from the body end surface 190 to the bearing portion 182.

The inner body surface 194 may be disposed opposite the outer body surface 192. The inner body surface 194 may define a portion of the aperture 184. In at least one configuration, the inner body surface 194 may be an inside circumferential surface of the body 180 and may engage or contact the cylindrical portion 160 of the spider shaft 132.

The retainer aperture 196 may extend from the outer body surface 192 to the inner body surface 194. The retainer aperture 196 receives the retainer pin 96 and may extend along a retainer aperture axis 198. In the configuration shown, the retainer aperture 196 extends completely through the body 180 from the outer body surface 192 to the inner body surface 194 and then resumes on the opposite side of the aperture 184 and extends from the inner body surface 194 to the outer body surface 192. In such a configuration, the retainer aperture 196 has two portions that are coaxially disposed and located on opposite sides of the retainer aperture 196.

The bearing portion 182 is disposed between the pinion gear 92 and the body 180. For instance, the bearing portion 182 may extend from the pinion gear 92 to the body 180. The bearing portion 182 extends from the body 180 and may be integrally formed with the body 180. In at least one configuration, the bearing portion 182 may include a bearing surface 200, an outer bearing portion surface 202, an inner bearing portion surface 204, and a step surface 206.

The bearing surface 200 faces toward the pinion gear 92. As such, the bearing surface 200 may be disposed opposite the body end surface 190. The bearing surface 200 may engage or contact the arcuate surface 170 of the pinion gear 92 and may be aligned with or disposed substantially parallel to the arcuate surface 170. As such, the bearing surface 200 may help support the pinion gear 92 and provide a smooth surface against which the pinion gear 92 may rotate. The bearing surface 200 may encircle the aperture 184 and the aperture 184 may extend from the bearing surface 200.

The outer bearing portion surface 202 faces away from aperture 184. In at least one configuration, the outer bearing portion surface 202 may be an outside circumferential surface of the bearing portion 182. The outer bearing portion surface 202 may extend from the bearing surface 200 to the step surface 206.

The inner bearing portion surface 204 is disposed opposite the outer bearing portion surface 202. The inner bearing portion surface 204 may define a portion of the aperture 184.

In at least one configuration, the inner bearing portion surface 204 may be an inside circumferential surface of the bearing portion 182 and may be spaced apart from the cylindrical portion 160 of the spider shaft 132.

The step surface 206 is disposed opposite the bearing surface 200. The step surface 206 may extend from the outer body surface 192 of the body 180 to the outer bearing portion surface 202 of the bearing portion 182. The step surface 206 may be disposed at an oblique angle with respect to the body end surface 190. For instance, the step surface 206 may extend progressively further from the body end surface 190 and the distance from the body end surface 190 and the spider shaft axis 150 increases. The step surface 206 may or may not be disposed parallel to the bearing surface 200. For instance, the step surface 206 may be configured as a tapered conical surface while the bearing surface 200 may be a part spherical surface that is continuously curved. In at least one configuration, the step surface 206 may be disposed in a nonparallel and non-perpendicular relationship with the bearing surface 200, a distal end surface of an adjacent or corresponding spider shaft 132, or both.

The aperture 184 receives the spider shaft 132. The aperture 184 is defined by the body 180 and the bearing portion 182. The aperture 184 may be configured as a through hole that may extend from the body end surface 190 to the bearing surface 200. In at least one configuration, the distal end surface 152 of the spider shaft 132 may be received inside the aperture 184.

The retainer pin 96 secures the pinion gear retainer 94 to the spider shaft 132. The retainer pin 96 may have any suitable configuration. For instance, the retainer pin 96 may be configured as a shaft or pin like a roll pin or a fastener like a screw or set screw. The retainer pin 96 may be received inside the retainer hole 156 of the spider shaft 132 and the retainer aperture 196 of the pinion gear retainer 94. The retainer pin 96 may protrude out of both ends of the retainer hole 156 in the spider shaft 132 and into corresponding portions of the retainer aperture 196 in the pinion gear retainer 94.

Referring to FIGS. 2 and 3, the clutch collar 28, if provided, may be rotatable about the axis 60 with the input shaft 24. In addition, the clutch collar 28 may be moveable along the axis 60 to engage or disengage a first side gear 80 of the interaxle differential unit 26. The clutch collar 28 may encircle the first side gear 80 of the interaxle differential unit 26 and may be separated from and may not be engageable with the gear nest 84. In at least one configuration, the clutch collar 28 may be generally ring-shaped and may define a clutch collar hole 210, a clutch collar spline 212, a clutch collar face gear 214, and an annular groove 216.

Referring primarily to FIG. 3, the clutch collar hole 210 may extend around the axis 60. The clutch collar hole 210 may receive the input shaft 24.

The clutch collar spline 212 may be disposed in the clutch collar hole 210. The clutch collar spline 212 may include a plurality of spline teeth that may extend toward the axis 60 and that may mate or mesh with the teeth of the first spline 70 of the input shaft 24. As such, the clutch collar 28 may be rotatable about the axis 60 with the input shaft 24 and may be moveable along the axis 60 or moveable in an axial direction with respect to the input shaft 24.

The clutch collar face gear 214 may include a set of teeth that may be arranged around the axis 60 and that may face toward and extend toward the interaxle differential unit 26. The teeth of the clutch collar face gear 214 may selectively engage the face gear teeth 112 of a first side gear 80 of the interaxle differential unit 26. The clutch collar 28 may move between an unlocked position and a locked position. The clutch collar face gear 214 may be disengaged from the face gear teeth 112 of the first side gear 80 when the clutch collar 28 is in the unlocked position, thereby permitting the first side gear 80 to rotate about the axis 60 with respect to the input shaft 24. The clutch collar face gear 214 may engage and mate or mesh with the face gear teeth 112 of the first side gear 80 when the clutch collar 28 is in the locked position, thereby inhibiting the first side gear 80 from rotating about the axis 60 with respect to the input shaft 24.

The annular groove 216, if provided, may receive a linkage, such as a shift fork, that may operatively connect the clutch collar 28 to an actuator that may position the clutch collar 28 along the axis 60.

Referring to FIG. 2, the driven gear 30 is rotatable about a second axis 220. For example, the drive pinion 32 may be received in a center bore of the driven gear 30 and the driven gear 30 may be fixedly disposed on the drive pinion 32 or may be couplable to the drive pinion 32 such that the driven gear 30 and the drive pinion 32 may rotate together about the second axis 220. The driven gear 30 may include a plurality of teeth that may be generally arranged about an outside diameter of the driven gear 30 and that may mate or mesh with the teeth of the drive gear 114. The second axis 220 may be disposed substantially parallel to the axis 60. It is noted that the section plane for FIG. 2 extends through the axis 60 and the second axis 220.

The drive pinion 32 helps operatively connect the torque source to the differential assembly 40. The drive pinion 32 may be spaced apart from the input shaft 24 and may be configured to rotate about an axis, such as a second axis 220. The drive pinion 32 may be rotatable with the driven gear 30. A gear portion having teeth may be disposed at an end of the drive pinion 32.

Referring to FIG. 2, the output shaft 34 may extend along and may be rotatable about the axis 60. For instance, the output shaft 34 may be supported by one or more bearings that may be disposed on the housing assembly 20. The output shaft 34 may be operatively connected to the interaxle differential unit 26. For example, the output shaft 34 may be coupled to the second side gear 82 and may be rotatable about the axis 60 with the second side gear 82.

Referring to FIG. 1, the output yoke 36 facilitates coupling of the axle assembly 10 to another axle assembly. For instance, the output yoke 36 may be fixedly coupled to the output shaft 34 in any suitable manner, such as with mating splines and a fastener like a nut. The output yoke 36 may be operatively connected to a second axle assembly in any suitable manner, such as via a prop shaft. The output yoke 36 may have any suitable configuration. For instance, the output yoke 36 may have a configuration similar to that shown or may have a disc configuration similar to that depicted for the input yoke 22.

Referring to FIG. 1, the axle shafts 38 are configured to transmit torque between the differential assembly 40 to corresponding wheel hubs and wheels. The axle shafts 38 may extend along and may be rotatable about an axis 230, which may be an axis of rotation of the differential assembly 40. Each axle shaft 38 may have a first end and a second end. The first end may be operatively connected to the differential assembly 40. The second end may be disposed opposite the first end and may be operatively connected to a wheel.

The differential assembly 40 may be at least partially received in the housing assembly 20. The differential assembly 40 may be rotatable about the axis 230 and may be rotatably supported on the differential carrier 52 via the bearing supports 58. The axis 230 may be disposed substantially perpendicular to the second axis 220. The differential assembly 40 may transmit torque to the axle shafts 38 and wheels. For example, the differential assembly 40 may be operatively connected to the axle shafts 38 and may permit the axle shafts 38 to rotate at different rotational speeds in a manner known by those skilled in the art. The differential assembly 40 may have a ring gear that may have teeth that may mate or mesh with the teeth of the gear portion of the drive pinion 32. Accordingly, the differential assembly 40 may receive torque from the drive pinion 32 via the ring gear and transmit torque to the axle shafts 38.

An axle assembly as described above allows an interaxle differential unit to be provided without a case, such as a case that may encircle the axis of rotation of the interaxle differential unit and that may extend from one spider shaft to another spider shaft (e.g., may have holes that receive corresponding spider shafts about which a corresponding pinion gear may rotate). Such a case may be a one-piece case or a multi-piece case that is split such that a pair of case portions are mounted to each other and cooperate to define a hole that receives a spider shaft. Eliminating the case of an interaxle differential unit reduces the weight and cost of the interaxle differential unit. In addition, such a configuration may allow an interaxle differential unit to be provided with fewer parts than interaxle differential unit designs that have a case, which may help reduce assembly time of the interaxle differential unit and associated costs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
  an input shaft that is rotatable about an axis;
  an output shaft that is rotatable about the axis; and
  an interaxle differential unit that includes:
    a first side gear that is rotatable about the axis and is selectively couplable to the input shaft;
    a second side gear that is rotatable about the axis with the output shaft; and
    a gear nest that includes:
      a spider that is rotatable with the input shaft, the spider having a spider ring that encircles the input shaft, a first spider shaft that extends from the spider ring, and a second spider shaft that extends from the spider ring and is spaced apart from the first spider shaft;
      first and second pinion gears that are rotatably disposed on the first and second spider shafts, respectively, and that mesh with the first side gear and the second side gear; and
      first and second pinion gear retainers that are fastened to the first and second spider shafts, respectively, such that the first and second pinion gear retainers are stationary with respect to the first and second spider shafts and engage the first and second pinion gears, respectively, wherein the first and second pinion gear retainers are spaced apart from each other, the first pinion gear retainer has a body and a bearing portion that cooperate to define an aperture that receives the first spider shaft, the body defines a retainer aperture that receives a retainer pin that fastens the first pinion gear retainer to the first spider shaft, the bearing portion engages the first pinion gear and extends further from the first spider shaft than the body extends from the first spider shaft, and the spider ring is the only component of the axle assembly that engages both the first spider shaft and the second spider shaft.

2. The axle assembly of claim 1 wherein the interaxle differential unit does not include a case that is rotatable about the axis and inside which the first side gear, the second side gear, and the gear nest are disposed.

3. The axle assembly of claim 1 wherein the axle assembly includes a differential assembly and a housing assembly that has an axle housing and a differential carrier that is mounted to the axle housing and upon which the differential assembly is rotatably supported, wherein the interaxle differential unit is disposed inside the differential carrier and the differential carrier is the only component of the axle assembly that encircles both the axis and the gear nest.

4. The axle assembly of claim 3 wherein the differential carrier is the only component of the axle assembly that encircles the first side gear.

5. The axle assembly of claim 1 wherein the first spider shaft has a retainer hole that receives the retainer pin and the retainer hole is positioned along the first spider shaft between a flat of the first spider shaft and a distal end surface of the first spider shaft.

6. An axle assembly comprising:
an input shaft that is rotatable about an axis;
an output shaft that is rotatable about the axis; and
an interaxle differential unit that includes:
  a first side gear that is rotatable about the axis and is selectively couplable to the input shaft;
  a second side gear that is rotatable about the axis with the output shaft; and
  a gear nest that includes:
    a spider that is rotatable with the input shaft, the spider having a spider ring that encircles and engages the input shaft, and a set of spider shafts that extend from the spider ring in a direction that extends away from the axis, wherein members of the set of spider shafts are spaced apart from each other;
    a set of pinion gears that mesh with the first side gear and the second side gear, wherein each member of the set of pinion gears is rotatably disposed on a corresponding member of the set of spider shafts; and
    a set of pinion gear retainers, wherein each member of the set of pinion gear retainers is fastened to a corresponding member of the set of spider shafts and contacts a corresponding member of the set of pinion gears, wherein the members of the set of pinion gear retainers are spaced apart from each other and do not contact each other, each member of the set of pinion gear retainers has a body and a bearing portion that cooperate to define an aperture that receives a corresponding member of the set of spider shafts, the body defines a retainer aperture that receives a corresponding retainer pin that fastens the pinion gear retainer to a corresponding spider shaft, and the bearing portion engages a corresponding member of the set of pinion gears and extends further from the spider shaft than the body extends from the spider shaft.

7. The axle assembly of claim 6 wherein the spider is secured to the input shaft with mating splines.

8. The axle assembly of claim 6 wherein the body has a body end surface that faces away from the bearing portion, an outer body surface that extends from the body end surface to the bearing portion, and an inner body surface that is disposed opposite the outer body surface and that partially defines the aperture, wherein the retainer aperture extends from the outer body surface to the inner body surface.

9. The axle assembly of claim 8 wherein the bearing portion has a bearing surface that contacts a corresponding pinion gear, wherein the bearing surface is nonplanar.

10. The axle assembly of claim 9 wherein each member of the set of spider shafts extends along a corresponding spider shaft axis, the bearing portion has an outer bearing portion surface that extends from the bearing surface, and an inner bearing portion surface that is disposed opposite the outer bearing portion surface and that partially defines the aperture, wherein the outer bearing portion surface is disposed further from the corresponding spider shaft axis than the outer body surface is disposed from the corresponding spider shaft axis.

11. The axle assembly of claim 10 wherein the bearing portion has a step surface that extends from the outer bearing portion surface to the outer body surface of the body.

12. The axle assembly of claim 11 wherein the step surface is disposed opposite the bearing surface and is disposed in a non-parallel and non-perpendicular relationship with the bearing surface.

13. The axle assembly of claim 11 wherein members of the set of spider shafts have a distal end surface that faces away from the axis, and the step surface is disposed in a non-parallel and non-perpendicular relationship with a corresponding distal end surface.

14. The axle assembly of claim 13 wherein each member of the set of spider shafts has a cylindrical portion that extends from the distal end surface, wherein the body encircles the cylindrical portion.

15. The axle assembly of claim 14 wherein each member of the set of spider shafts has a flat that extends from the cylindrical portion, wherein the bearing portion encircles the flat.

16. The axle assembly of claim 6 wherein the spider ring defines a center bore that receives the input shaft and a splined portion is disposed inside the center bore, wherein a groove is provided in the spider ring that encircles the axis and extends away from the axis.

17. The axle assembly of claim 16 wherein the groove bisects the splined portion.

18. The axle assembly of claim 16 wherein the spider ring has an exterior surface that faces away from the axis and a lubricant passage that is disposed inside the spider ring and that extends from the exterior surface to the center bore.

19. The axle assembly of claim 18 wherein the lubricant passage extends from the exterior surface to the groove.

20. The axle assembly of claim 18 wherein the lubricant passage is disposed at an oblique angle with respect to the axis.

* * * * *